United States Patent [19]

Bussinger

[11] Patent Number: 5,452,775
[45] Date of Patent: Sep. 26, 1995

[54] OFF-ROAD PASSENGER VEHICLE INCORPORATING AN INERTIA POWERED SAFETY BRAKE SYSTEM

[75] Inventor: Allen L. Bussinger, Saginaw, Mich.

[73] Assignee: Amigo Mobility International, Inc., Saginaw, Mich.

[21] Appl. No.: 229,684

[22] Filed: Apr. 19, 1994

[51] Int. Cl.⁶ .................................................. B60T 1/00
[52] U.S. Cl. ........................... 188/2 F; 188/2 D; 188/29; 180/216; 180/907
[58] Field of Search .................. 188/2 D, 2 F, 16, 188/19, 29, 20, 31, 68, 69; 180/216, 907; 280/33.994, 47, 38, 650

[56] References Cited

U.S. PATENT DOCUMENTS

| | | | |
|---|---|---|---|
| 2,639,785 | 5/1953 | Vickers | 188/29 |
| 2,782,870 | 2/1957 | Sill | 188/2 F |
| 3,117,653 | 1/1964 | Altherr | 188/20 X |
| 4,204,588 | 5/1980 | Kawecki | 188/2 F |
| 4,320,818 | 3/1982 | Knoche | 188/2 F |
| 4,350,227 | 9/1982 | Knoche | 188/2 F |
| 4,595,214 | 6/1986 | Downing | 188/29 X |
| 4,623,163 | 11/1986 | Potts | 280/649 |
| 4,846,295 | 7/1989 | Shepard et al. | 180/68.5 |
| 5,090,517 | 2/1992 | Doughty | 188/19 |

FOREIGN PATENT DOCUMENTS

0204040  12/1986  European Pat. Off. ............ 188/2 F

Primary Examiner—Josie A. Ballato
Attorney, Agent, or Firm—Learman & McCullough

[57] ABSTRACT

A safety or emergency brake system for a slow moving off-road passenger vehicle has a brake lever that is adapted to pivot into contact with a wheel-mounted flexible tire that partially supports the vehicle and then be further pivoted by the tire, as it rotates in a forward direction due to vehicle inertia, into an interference position with the tire that locally deflects the tire to prevent further wheel rotation. The brake is activated by a device sensing impending vehicle impact with an obstacle, or by the vehicle operator, and is initially released by rotation of the tire in a reverse direction as the vehicle is caused to reverse or move backward.

31 Claims, 6 Drawing Sheets

OFF-ROAD PASSENGER VEHICLE INCORPORATING AN INERTIA POWERED SAFETY BRAKE SYSTEM

TECHNICAL FIELD

This invention relates to off-road passenger vehicle brake systems and more particularly to safety or emergency brake systems that act directly on one or more of the vehicle tires.

BACKGROUND OF THE INVENTION

Off-road passenger vehicles such as golf carts typically have safety or emergency brake systems patterned after road vehicles, while slower moving other types of these passenger vehicles, such as self-propelled and motor powered vehicles for the physically disadvantaged including wheelchairs, so-called wheeled travel chairs and the like, typically have a simple friction type brake acting directly against one or more of the vehicle's wheels or tires to provide all braking operation. Examples of the latter are disclosed in U.S. Pat. Nos. 2,782,870; 4,204,588; 4,320,818, 4,350,227, 4,623,163 and 4,846,295. There are almost endless types of road vehicle brake systems but they are not well suited to providing safety brake operation for the slower moving self-propelled or motor powered shopping/travel carts, wheelchairs, wheeled travel chairs and the like, where the operator is disabled and may have limited or even no ability to operate a brake in an emergency situation. Nor do they offer a type of safety brake system particularly suited to the latter type of vehicles in some of the typical situations in which they operate. For example, there are situations with the latter vehicles where it would be highly desirable to over power the motor powering the vehicle and very rapidly lock up the wheels in advance of an impending impact either automatically or under the control of the operator, but provide a much milder wheel braking action in the reverse direction. Moreover, a safety brake system for the physically disabled should require little manual effort and otherwise be readily activated. In the above identified patents, various friction brake systems are disclosed that offer various types of braking operations to different degrees, but they do not offer a cost effective safety or emergency brake system that can provide emergency braking in a relatively simple and positive manner, let alone accomplish this automatically and with self-energization with little or no effort required of the vehicle operator and in advance of an impending impact with an obstacle in the path of the vehicle.

SUMMARY OF THE INVENTION

The present invention offers a cost effective improvement in safety brake systems for slow moving off-road passenger vehicles that are supported with one or more wheel mounted flexible tires by utilizing the flexible characteristics of one or more of the tires which may be either resiliently solid, semi-pneumatic or pneumatic to provide a positive acting safety brake operation to stop and hold the vehicle. In the safety brake system of the present invention, there is provided at least one brake lever that is adapted to pivot into contact with at least one of the tires that supports the vehicle as the tire rotates in a forward direction and then be further pivoted by this tire, as it continues to rotate in the forward direction due to vehicle inertia, into a locked interference position that locally deflects the tire by an amount sufficient to prevent further wheel rotation. As a result, very little external force is required to effect the safety brake operation, as all that is required is an amount sufficient to initially contact the brake lever with the tire. The inertia of the vehicle than takes over as the brake energizer at the still forwardly rotating tire to force the brake lever into its interference position with the tire to effect full braking operation to stop and hold the vehicle, thus relieving the vehicle operator of having to apply the required effort. The safety brake lever is released by simply reversing the direction of the vehicle; i.e. backing up, with the reverse rotation of the tire then forcing the brake lever to initially pivot in the opposite direction out of its interfering engagement therewith. The brake lever is normally held in an off position clear of the tire by a return spring that is connected to the brake lever and is adapted to be pulled to operate the brake lever against this return spring. The cable is connected to a brake operating lever that is adapted to be operated by an impending obstacle or by the vehicle operator. In either case, the magnitude of the external force required at the brake operating lever to effect safety brake operation is only that force necessary to overcome the return spring and pivot the brake lever to initially contact with the forwardly rotating tire, whereafter the continued forward rotation of the tire due to vehicle inertia acts on the brake lever to force it into a locked interference position with the tire to brake it and, thereby the vehicle, to a stop which is held until the vehicle is driven in reverse.

The safety brake system is readily adapted to operate on two or more wheels and tires having a common axis. For example, in a three-wheeled, off-road passenger vehicle, where there are two rear wheels supporting the vehicle and sharing a common axis and a single steerable front wheel, two brake levers may be provided to brake the respective rear tires. In this case, the two brake levers are associated with the respective tires in the manner previously described, but are fixed to a common laterally extending pivot shaft. The aforementioned single brake actuating cable is connected to either one of the two brake levers, along with associating the single return spring therewith.

Another feature of the safety brake system lies in the mounting of the brake lever(s) so that it is adjustable to accommodate different size tires without changing the braking operation. In addition, the brake levers are adaptable to mounting in different locations on the vehicle frame without changing their braking relationship to the tires, which is advantageous for the packaging of the safety brake system in vehicles having different space limitations. Moreover, this arrangement also lends itself to retrofitting to existing vehicles of various designs with obsolete braking systems.

It is therefore an object of the present invention to provide a new and improved safety brake system for an off-road passenger vehicle that operates directly on one or more flexible tires supporting the vehicle, and uses vehicle inertia at the tire to effect full braking action to stop the vehicle.

Another object is to provide a safety brake system for an off-road passenger vehicle that operates directly on one or more flexible tires supporting the vehicle, using the forward rotation of the tire to energize the brake action, and also to reverse rotation of the tire or tires to release the brake.

Another object is to provide a safety brake system for an off-road passenger vehicle having a brake lever that is caused to initially contact with one of the tires supporting the vehicle as the tire rotates in a forward direction, whereupon the brake lever is then forced to further pivot by the forwardly rotating tire due to vehicle inertia into an interfering tire flexing relationship with the tire that prevents further wheel rotation to brake the vehicle to a stop, and wherein the brake lever is forced by the tire to pivot in the opposite direction to release its brake action upon reverse rotation of the tire.

Another object is to provide a safety brake system for an off-road passenger vehicle having a brake lever that is actuated by a cable to pivot into initial contact with one of the tires supporting the vehicle, with the brake lever then being forced by the tire as it continues to rotate in a forward direction to further pivot into an interfering relationship with the tire that locally deflects the tire to a degree sufficient to prevent further wheel rotation to brake the vehicle to a stop.

Another object is to provide a safety brake system for an off-road passenger vehicle having a brake lever that is actuated by a cable and against a return spring to initially pivot into contact with one of the tires supporting the vehicle with the brake lever then forced by the tire as it continues to rotate in a forward direction due to vehicle inertia to further pivot into a locked position where the brake lever locally deflects the tire by an amount sufficient to prevent further wheel rotation to brake the vehicle to a stop.

Another object is to provide a safety brake system for an off-road vehicle having a brake lever that is actuated by a cable and against a return spring to initially pivot into contact with one of the tires supporting the vehicle with the brake lever then forced by the tire as it continues to rotate in a forward direction due to vehicle inertia to further pivot into an interfering relationship with the tire that locally deflects the tire to prevent further wheel rotation to brake the vehicle to a stop and wherein the cable is actuated by a lever by impact with an impending obstacle or under control of the vehicle operator.

These and other objects, advantages and features of the present invention will become more apparent from the following detailed description and accompanying drawings in which:

DETAILED DESCRIPTION OF THE PREFERRED EMBODIMENT

Figure 1:
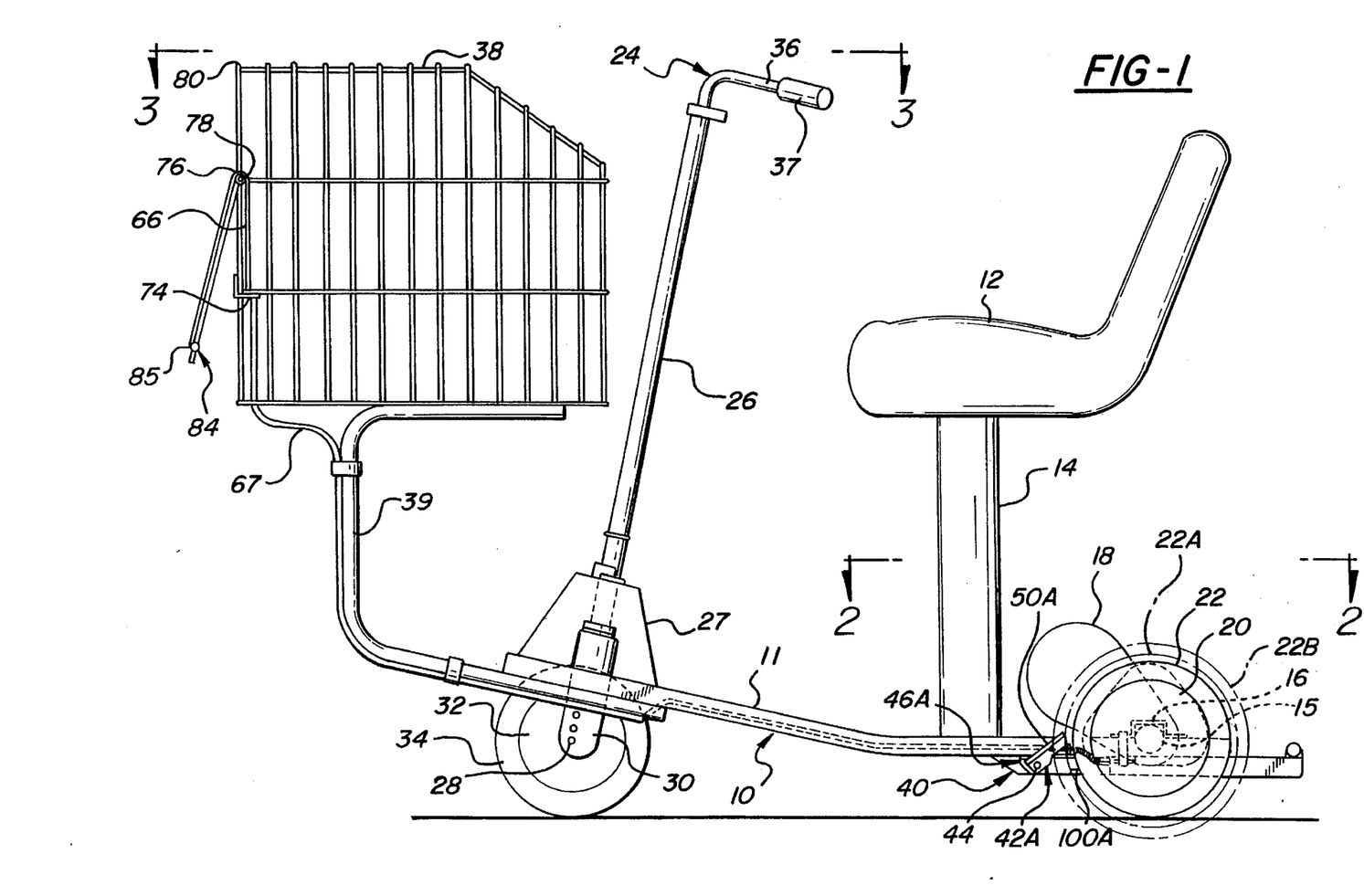
FIG. 1 is a side elevation of an off-road passenger vehicle having a safety brake system according to the present invention.
Figure 2:
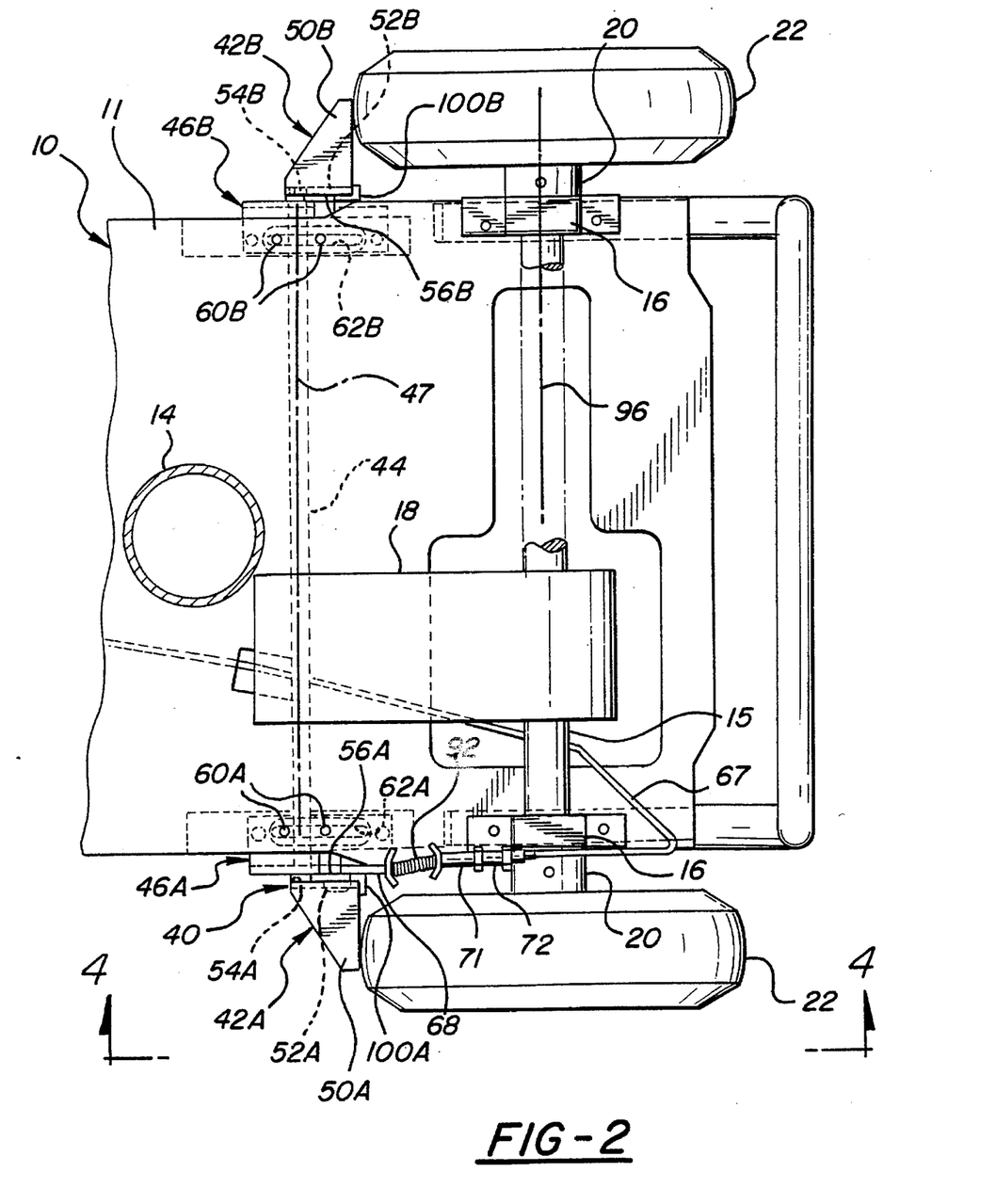
FIG. 2 is an enlarged view taken along the line 2—2 in FIG. 1 when looking in the direction of the arrows.
Figure 3:
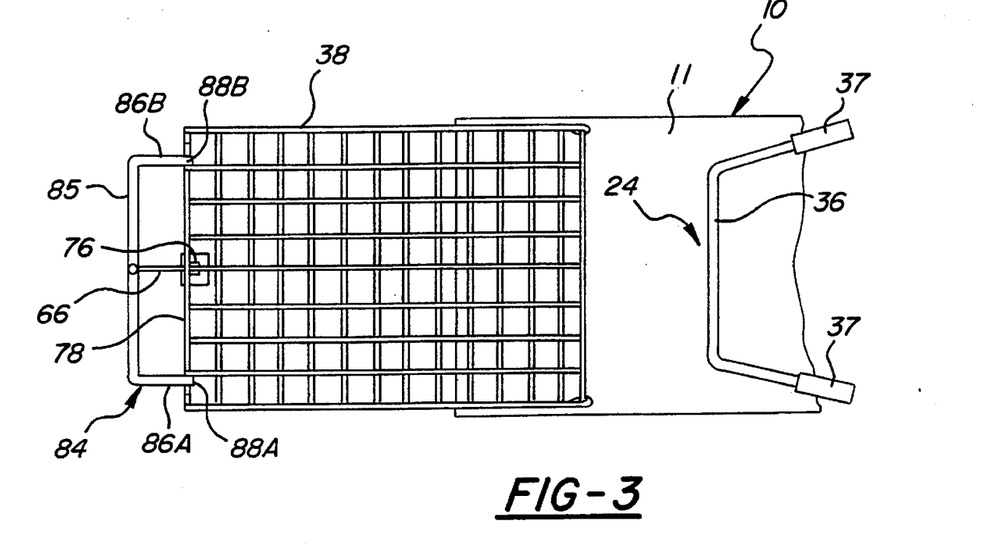
FIG. 3 is a view taken along the line 3—3 in FIG. 1 when looking in the direction of the arrows.
Figure 4:
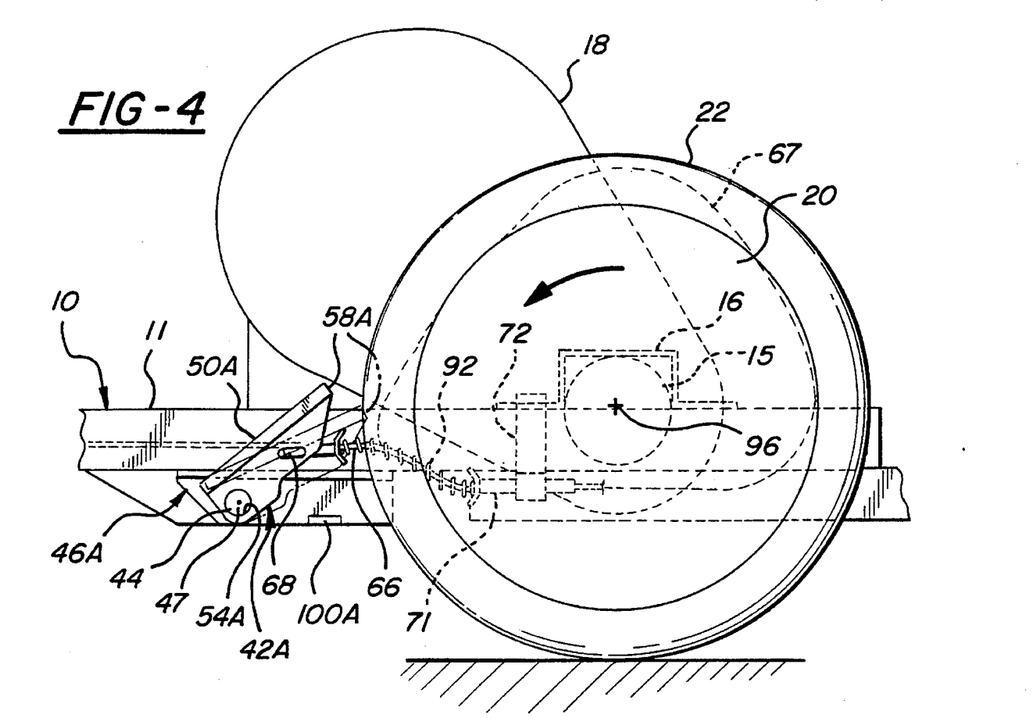
FIG. 4 is an enlarged fragmentary view of the brake taken along the line 4—4 in FIG. 2 when looking in the direction of the arrows.

There is illustrated in FIGS. 1–3 a three-wheeled, off-road passenger vehicle 10 comprising a combined floor plate and frame 11 on which is mounted a driver/passenger seat 12 atop a post 14. A laterally extending rear axle 15 is mounted on the frame near the rear end thereof in bearing assemblies 16 and is driven by an electric motor 18 mounted on the frame 11 behind the seat via suitable drive transmission elements (not shown). A housing also (not shown) may be provided as usual for the motor and transmission elements assembly. A wheel 20 with a tire 22 mounted thereon is fixed to each outboard end of the rear axle 15 and supports the rear of the vehicle.

Steering and support of the front end of the vehicle is provided by a steering post assembly 24 comprising a steering post 26 mounted at a slightly rearward from vertical angle on the front end of the frame 11 in a steering post support and bearing assembly 27. The steering post 26 supports a laterally extending axle 28 below the frame 11 in two downwardly and slightly forwardly extending parallel forks 30 near their lower end (only one fork being shown). A wheel 32, with a tire 34 mounted thereon, is rotatably mounted on the front axle 28 and supports the front of the vehicle. The front wheel 32 turns with the steering post 26 to steer the vehicle which is facilitated by a steering bar 36 that is fixed to the upper end of the steering post. The steering bar 36 extends laterally of the vehicle from the steering post 26 and has two rearwardly extending handles 37 that are arranged to be conveniently grasped by an operator passenger while seated (See FIGS. 1 and 3). The two rear wheels and tires 20,22 are larger in diameter than the front wheel and tire 32,34 and may along with the front wheel and tire be of various size in adjusting the vehicle to different ride heights. The front and rear tires 22 and 34 act as a cushioning suspension in these kinds of vehicles where the axles are solidly mounted on the frame and are made of a flexible material such as rubber or plastic and may be either resiliently solid, pneumatic or semi-pneumatic. The invention uses the flexibility of one or more of these tires to provide positive self-energizing braking operation to stop the vehicle.

The three-wheeled vehicle 10, with its electric motor driven rear axle and two driven rear wheels with flexible tires, and its single and smaller front steerable wheel also with a flexible tire, is lightweight and compact and well suited for off-road use by those needing the mobility and the ease of use that it provides. For example, the vehicle 10 is well suited to use by the physically disabled or infirm to travel on pedestrian walkways and to access stores, shopping malls, outdoor events, etc. Storage of goods on the vehicle is provided by a lightweight wire basket 38 that is mounted on the front of the vehicle. The basket 38 is secured in place with a forwardly extending basket support 39 that is rigidly fixed to the front end of the vehicle frame 11 on the underside thereof, as by welding.

In accordance with the present invention, a safety brake system, generally designated as 40, is incorporated in the vehicle to simultaneously brake both the rear wheels 20. The safety brake system comprises brake levers 42A and 42B for the respective rear wheels that are rigidly fixed to a laterally extending horizontal pivot rod or shaft 44. The pivot rod 44 spans the frame 11 and is mounted thereon in an underneath location parallel to the rear axle 15 with brackets 46A and 46B. The brake levers 42A and 42B are of uniform thickness and identical configuration, except for being of right and left hand orientation, and each includes a laterally extending triangular shaped (in plan view) brake flange 50A and 50B, and a vertical pivot flange 52A and 52B, respectively. The pivot rod 44 is received at its ends in a horizontal opening 54A and 54B in the respective vertical pivot flanges 52A and 52B of the brake levers 42A and 42B and is welded to the pivot flanges at these joints to provide a very rigid connection between the pivot shaft and brake levers. The respective triangular shaped flanges 50A and 50B of the brake levers are preferably of right-angle configuration, with one respective right angle side or edge 56A and 56B respectively integrally joined with the respective vertical pivot flange 52A and 52B (See FIG. 2). The other edge 58A and 58B of the respective brake levers 42A and 42B extends laterally ahead of the respective rear tire 22 and parallel to the rear axle 15 in a position to engage the rear tire in the manner described in more detail later.

The brake lever brackets 46A and 46B are of uniform thickness and identical configuration except for being of right and left hand orientation and are each secured to the underside of the vehicle frame 11 with carriage bolts 60A and 60B, respectively. The carriage bolts 60A and 60B extend through a longitudinal slot 62A and 62B in the respective brackets 46A and 46B and are received in separate vertical openings in the frame (See FIG. 1). The longitudinal slots 62A and 62B in the respective brake lever support brackets 46A and 46B extend longitudinally of the vehicle frame 11 and provide for adjusting the brake system to operate with different size tires as will be explained in more detail later.

The brake levers 42A and 42B are both actuated by a brake control which includes a single cable 66 that is received in a sheath 67 and has a hook shaped pin end 68 that is received in and captured by its bend in a hole or opening 70 in the vertical flange 52A of the one brake lever 42A. A horizontal cable guide sleeve 71 extending longitudinally of the vehicle frame 11 is receives the cable 66 at a distance from the pin end 68 and, together with an end of the sheath 67, is fixedly secured in any acceptable manner (such as via bracket 72) to the vehicle frame. The sheathed cable 66 extends rearwardly from the brake lever, and then makes a looping turn about the rear axle 15 and extends forwardly along the vehicle frame and thence up the basket support 39 to the basket 38 (See FIG. 1). At a point midway up the basket, the cable 66 passes through a cable guide 74 that is fixed to the basket. The cable sheath 67 terminates at this point and is connected by the guide 74 to the basket. The cable 66 extends upward from the guide 74 and over a pulley 76 that is mounted on one of the basket wires 78 below the top front basket edge 80. The cable 66 extends downwardly from the pulley 76 at the front of the basket and is connected to a safety brake bar 84. As illustrated in FIG. 3, the safety brake bar 84 has a U-shape (in plan view) with a laterally extending horizontal center section 85 and two parallel arms 86A and 86B with hook shaped ends 88A and 88B respectively by which the brake bar is pivotally mounted on the one basket wire 78 on the same axis as the cable pulley 76. The center brake bar section 85 spans the basket and is connected at a midpoint thereof to the cable 66.

Figure 5:
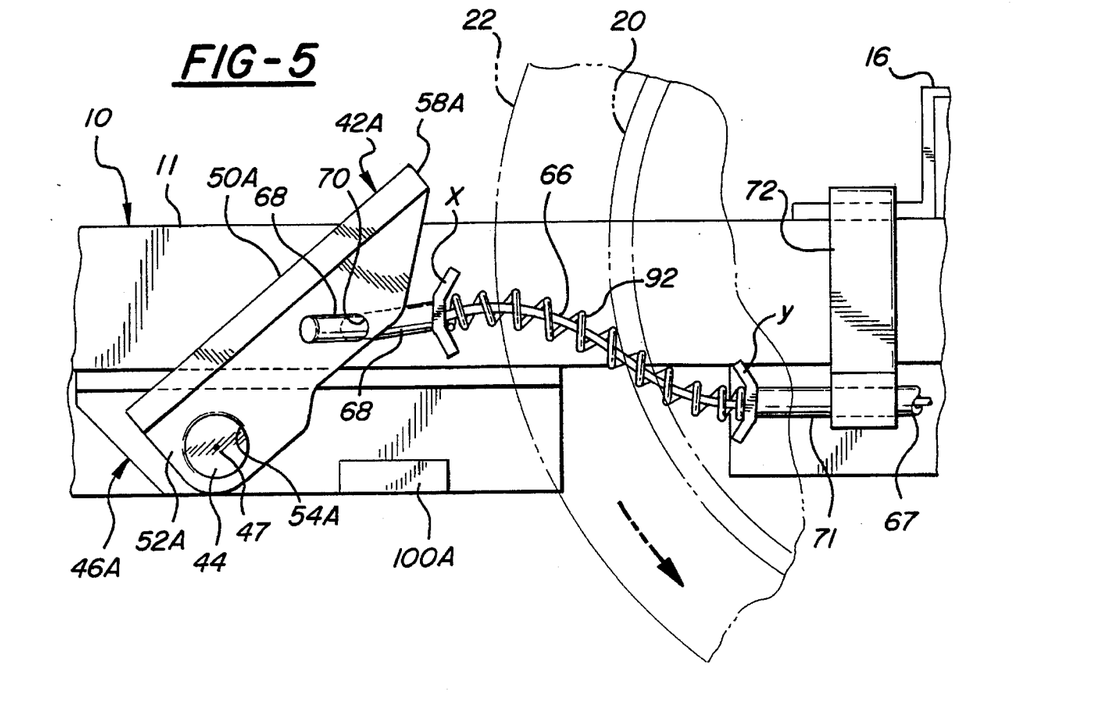
FIG. 5 is a still more enlarged fragmentary view taken along the line 4—4 in FIG. 2 when looking in the direction of the arrows.

At the brake lever the brakes control includes, a compression coil spring 92 which may be received on the cable 66 in one embodiment of the invention and is captured between flanges x and y provided on pin end 68 and sleeve 71 respectively (See FIG. 5). The spring 92 is preloaded and normally holds the brake lever 42A in an upwardly pivoted brake release position, clear of the associated rear tire 22 as illustrated in FIGS. 1,2,4 and 5. The pivot rod 44 connecting the two brake levers transmits motion to the other brake lever 42B causing it to assume a similar position with respect to its associated rear tire. This spring action also pulls on the cable 66 causing it to pivot the safety brake bar 84 upwardly to an extended position outward of the front of the basket 38 in readiness to activate the safety brake system.

In a modified embodiment of the structure (see FIG. 7), the return spring for the rod 44 and brake levers or shoes 42A and 42B is located on the opposite side of the vehicle from the operating cable 66. In this form of the invention, a spring 92 is not provided in encircling relation on the cable 66. In this embodiment, the brake control includes a rod 67A which has a hook shaped end 67B which is received through the opening 70 provided in the brake shoe 42B. The rod 67A is notched as at 67C to receive and secure the one end of a coil spring 92A which is abutted at its opposite end by a flange 67D provided on bracket 46B. The rod 67A extends through an elongate slot 67E provided through the flange 67D.

Figure 7:
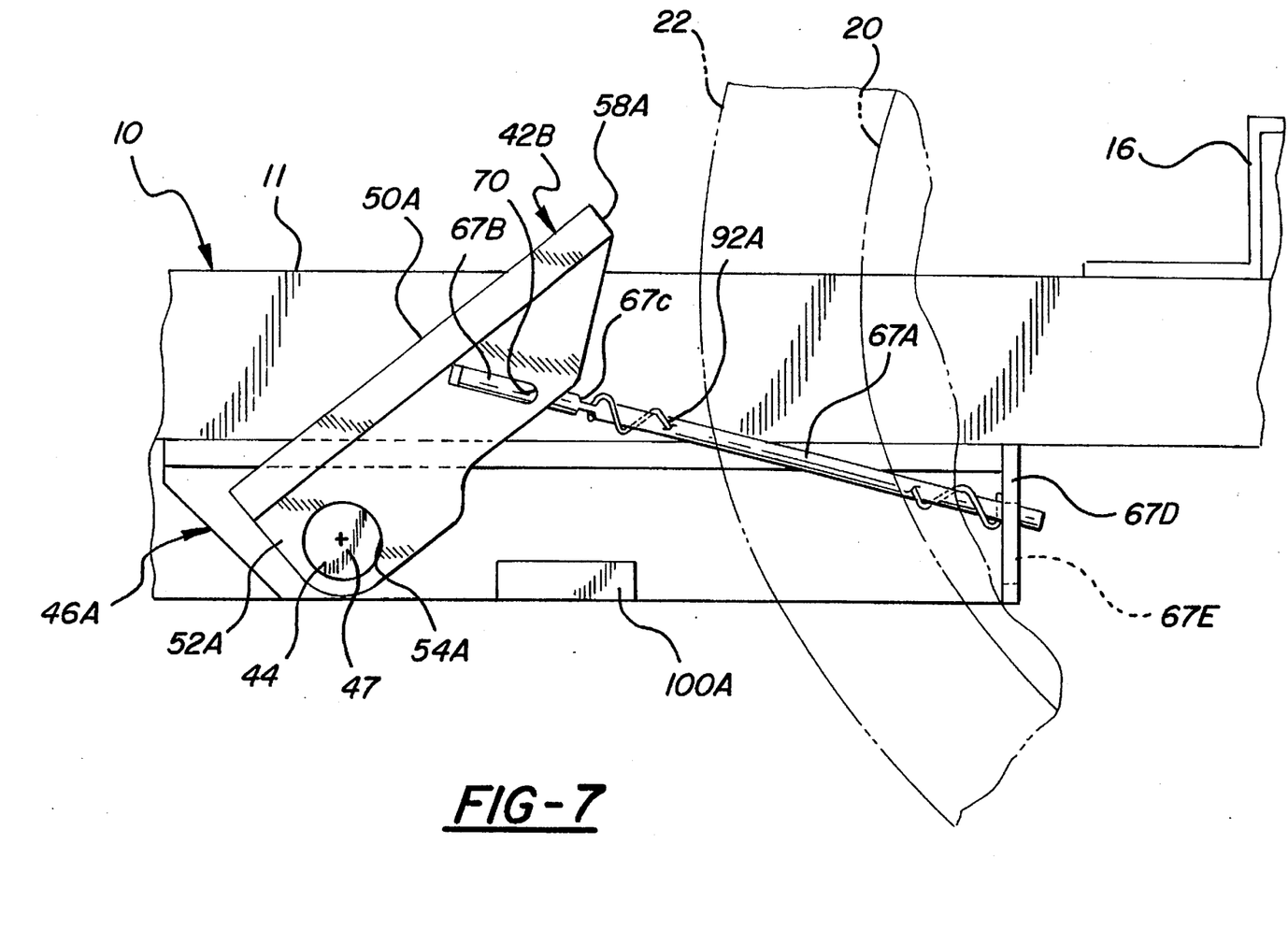
FIG. 7 is an enlarged fragmentary side elevational view of a modified embodiment in which the brake return spring is located on the opposite side of the vehicle from the brake operating cable system.

In this case, the spring 92A is compressed, as the cable causes the shaft 44 to pivot, when lever or shoe 42B is pulled from the position shown in FIG. 7 down to the horizontal locked position. When the spring 92A is once again permitted to expand, it will restore the shoes 42A and 42B to raised position.

THE OPERATION

Figure 6:
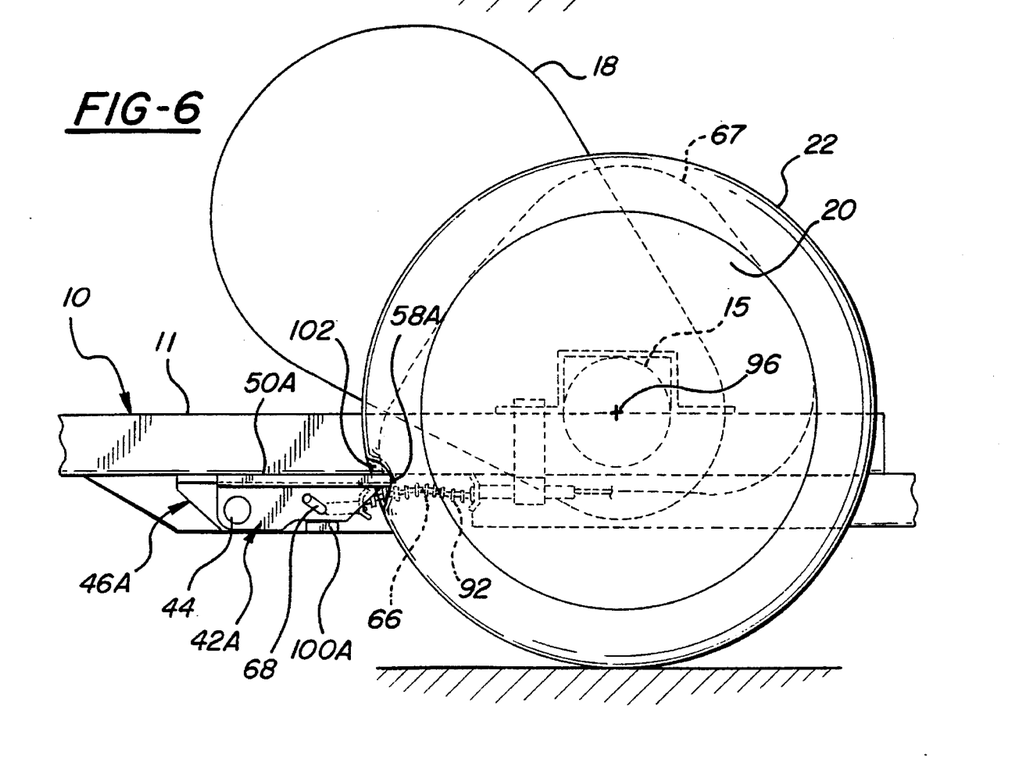
FIG. 6 is a view similar to FIG. 5 but showing the safety brake fully engaged.

When the safety brake bar 84 is depressed on encountering an obstacle, while the vehicle is moving forwardly, the pivoting thereof pulls on the cable 66 which in turn pulls the connected brake levers 42A and 42B downwardly about their pivot axis 47. The brake lever pivot axis 47 is located relative to the rear axle axis 96 and the outer diameter of the rear tire 22 so that the brake levers 42A and 42B initially make tangential contact at their respective top flange edge 58A and 58B with the respective rear tires 22, as shown in phantom line in FIG. 4, as the tires rotate in a forward direction as indicated by the arrow. Thereafter, the continued forward rotation of the rear wheels due to the vehicle inertia forces the brake levers to be pivoted further downward by their contact with the respective rear tires until their respective vertical pivot flange 52A and 52B bottoms on a lateral, horizontal stop flange 100A and 100B integral with and extending outboard from the respective brake lever support brackets 46A and 46B. This establishes a fully engaged or locked brake condition as illustrated in FIG. 6 wherein the brake levers 42A and 42B assume a horizontal position and have been drawn or forced into the respective tires to the point where their respective top flange edge 58A and 58B has locally deflected the associated rear tire at its outer diameter as indicated at 102 (see FIG. 6) by a significant amount sufficient to positively prevent further wheel rotation and bring the vehicle to a stop. The brake levers 42A and 42B are then held locked by the rear tires against their respective stop flanges 100A and 100B in their full engaged horizontal position to continue holding the vehicle stationary against any subsequent tendency for the rear tires to rotate in the forward direction. Release of the brake levers 42A and 42B is accomplished by simply backing up the vehicle, whereby the reversely turning rear tires 22 then force the brake levers to pivot upwardly until the return spring 92 or 92A takes over to fully return the brake levers 42A and 42B and the safety brake bar 84 to their normal release positions.

The safety brake system is adapted to accommodate a range of different rear tire sizes by adjusting the position of the brake lever support brackets 46A and 46B on the frame 11. The tires 22 shown represent the smallest in the range, and there are shown two progressively larger diameter sizes 22A and 22B in phantom line in FIG. 1. Adjustment to the larger size tires is made by temporarily loosening the carriage bolts 60A and 60B and sliding the brake lever support brackets forward, as permitted by their respective slot 60A and 60B, to a position where the brake levers are in a position to act as before, but on the larger size tires 22A or 22B.

In the illustrated embodiment, this relationship between the brake levers and tires wherein the brake levers assume a horizontal position in the locked brake-on condition places the pivot axis 47 of the brake levers forward of and below the axis 96 of the tires. It will be understood that the brake levers could be otherwise arranged about the tires and still maintain the desired operating relationship described above in employing vehicle inertia to provide the major brake applying self-energizing force. Such rearrangement might be desired for the best packaging of the various vehicle components to meet certain vehicle design objectives or space limitations. For example, the brake levers could be mounted behind the rear tires in an inverted position or angularly located about the tire axis from either this rearward position or the forward position so long as their under-axis-plane relationship is maintained with respect to the wheel and tire axis.

Figure 8:
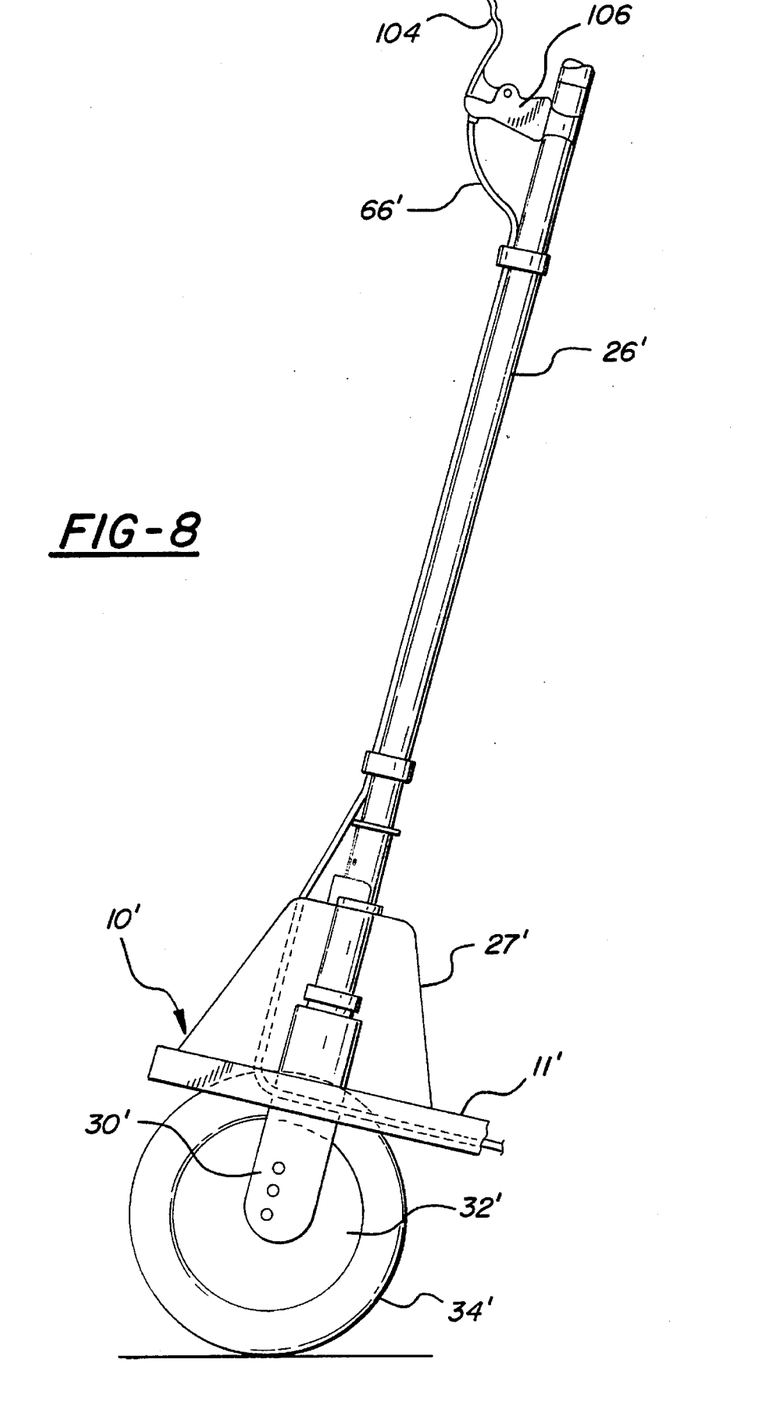
FIG. 8 is a side elevation view of the front of the vehicle in FIG. 1 but with another embodiment of the safety brake system according to the present invention.

The safety brake system is also readily adapted to activation by the vehicle operator as shown in FIG. 8, wherein the same numbers only primed (n'), are used to identify parts similar to those in the FIG. 1.embodiment and new numbers are used to identify new parts. In the FIG. 7 embodiment, the sheathed cable 66' is arranged to extend up the steering post 26' and is connected to a hand operated lever 104 that is mounted by a support bracket 106 on the steering post below the steering bar and in a position convenient to the passenger operator. The hand lever 104 is normally held in a readiness position like the safety brake bar 84 previously described and is grasped and pivoted by the passenger operator to initiate safety brake operation wherein the continued rotation of the rear wheels, using vehicle inertia, acts to fully apply or energize the brake levers and stop the vehicle, thus relieving the operator of having to apply such effort. When the vehicle is being backed, the brake levers may also be activated by lever 104, but with minimized force. This permits a limited braking to be achieved in a situation where, for instance, the back-loaded vehicle is backing down a ramp and more severe braking is not desirable.

The invention has been described in an illustrative manner with respect to several embodiments, and it is to be understood that the terminology that has been used is intended to be in the nature of words of description rather than of limitation. Obviously, many modifications and variations of the present invention in light of the above teachings may be made. It is therefore to be understood that within the scope of the appended claims, the invention may be practiced otherwise than as specifically shown and described.

I claim:

1. A safety brake system in combination with an off-road passenger vehicle having a frame supported on at least one wheel which has a flexible tire mounted thereon for rotation with said wheel about an axis of rotation, said system comprising a brake lever supported on said frame adapted to pivot into contact with the tire as the wheel rotates in one direction and then be forced by the rotating tire to pivot further into a fully engaged position where the brake lever causes local deflection of the tire to a degree sufficient to prevent further wheel rotation, and a brake control incorporated with said brake system adapted to normally hold said brake lever in a release position clear of the tire and to alternatively initiate contact of said brake lever with the tire to effect braking of the wheel; said brake control including a pull cable connected to said brake lever and a spring adapted to normally hold said brake lever in said release position.

2. A safety brake system as set forth in claim 1 wherein said pull cable extends to a forward end of the vehicle, an actuating lever is mounted on the forward end of the vehicle and is connected to said cable, and is adapted on contact with an obstacle in the path of the vehicle to pull on said cable to initiate contact of said brake lever with the tire.

3. A safety brake system as set forth in claim 1 wherein said pull cable extends to a forward end of the vehicle, and a hand operated lever, mounted at the forward end of the vehicle, is adapted to pull on said cable to initiate contact of said brake lever with the tire.

4. A safety brake system as set forth in claim 1 wherein the vehicle has two wheels each with a flexible tire mounted thereon, said brake lever is associated with the tire of one of the respective wheels and an additional brake lever is associated with the tire of the other wheel, and a pivot shaft is mounted for turning on said frame and is rigidly connected to each of said brake levers.

5. A safety brake system as set forth in claim 1 wherein a bracket supports said brake lever on said frame and said bracket is releasably mounted for fore and aft movement on said frame relative to said tire to adjust the fore and aft position of the brake lever on said vehicle.

6. A safety brake system as set forth in claim 1 wherein said brake lever has a vertical pivot mounting flange and an integral lateral flange with a lateral edge that contacts the tire.

7. A safety brake system as set forth in claim 6 wherein said lateral flange assumes a horizontal position in said fully engaged position of said brake lever.

8. A safety brake system as set forth in claim 1 wherein said brake lever has a lateral flange adapted to contact with the tire and an integral vertical flange is adapted to contact with a stop on said vehicle to determine said fully engaged position.

9. A safety brake system as set forth in claim 1 wherein said brake lever has a pivot axis located in a position forward of the tire and assumes a horizontal posture in its said fully engaged position said pivot axis being located below the said axis of rotation of the wheel and tire.

10. In combination an off-road vehicle comprising a frame with front and rear ends, a pair of frame supporting rear wheels mounted on said frame, at least one frame supporting steerable front wheel mounted on said frame, at least one of said wheels having a flexible tire mounted thereon, and a safety brake system comprising a brake lever, mounted on said frame adapted to be pivoted into initial contact with said tire as said tire and associated wheel rotate in a forward direction to move said vehicle forwardly, and positioned on said frame so as to be forced by contact with the rotating tire to pivot further in the same direction into a fully engaged position where the brake lever causes local deflection of said tire to a degree sufficient to prevent further rotation of said tire and associated wheel, and a brake control connected to said brake lever and adapted to normally hold said brake lever in a release position clear of said tire and to alternatively initiate contact of said brake lever with said tire to effect eventual braking of said tire and associated wheel.

11. A combination as set forth in claim 10 wherein said brake control comprises a pull cable connected to said brake lever and extending to a forward end of said frame, and an actuating lever mounted on the forward end of said frame and connected to said cable and adapted on contact with an obstacle in the path of the vehicle to pull on said cable to initiate contact of said brake lever with said tire.

12. A combination as set forth in claim 10 wherein said brake control comprises a pull cable connected to said brake lever and extending to a forward end of the said frame, and a hand lever is mounted on and at a forward end of said frame adapted to pull on said cable to initiate contact of said brake lever with said tire.

13. A combination as set forth in claim 10 wherein said one of said wheels is a rear wheel and said brake lever is associated with the tire provided thereon, an additional brake lever is associated with a tire provided on the other rear wheel, and a pivot shaft is rigidly connected to both of said brake levers and supported for turning on said frame to effect simultaneous braking of said rear tires.

14. A combination as set forth in claim 10 wherein said brake control includes a pull cable connected to said brake lever, and a compression coil spring adapted to normally hold said brake lever in said release position.

15. A combination as set forth in claim 10 wherein said brake lever has a lateral flange adapted to contact with said tire and also determine said fully engaged position.

16. A combination as set forth in claim 10 wherein a goods container is mounted on a front end of said frame and said brake control comprises a pull cable connected to said brake lever and extending to said goods container, and an actuating lever is mounted on a front side of said goods container and connected to said cable and adapted on contact with an obstacle to pull on said cable to initiate contact of said brake lever with said tire.

17. A combination as set forth in claim 10 wherein a steering post is associated with said front wheel and said brake control comprises a pull cable connected to said brake lever and extending to and along said steering post, and a hand lever is mounted on said steering post adapted to pull on said cable to initiate contact of said brake lever with said tire.

18. A combination as set forth in claim 17 wherein said actuating lever comprises a cross bar pivotally mounted on and spanning a front side of said goods container.

19. A combination as set forth in claim 10 wherein said brake control includes a lever actuated pull cable connected to said brake lever, and a spring adapted to normally hold said brake lever in said release position.

20. A combination as set forth in claim 10 wherein a brake lever support bracket having a laterally extending stop supports said brake lever and is adapted to be adjustably mounted in different positions with releasable fasteners on said frame, and said brake lever is adapted to engage said stop to establish said fully engaged position.

21. A combination as set forth in claim 20 wherein said brake lever has a vertical pivot mounting flange that engages said stop.

22. A combination as set forth in claim 20 wherein said brake lever support bracket has an elongated slot providing for the adjustable mounting of said brake lever support bracket on said frame.

23. A combination as set forth in claim 10 wherein said one of said wheels is a rear wheel and said brake lever is associated with the tire provided thereon, an additional brake lever is associated with a tire provided on the other rear wheel, a pivot shaft is rigidly connected to each of said brake levers, a pair of brake lever support brackets are associated with the respective said brake levers and support said pivot shaft on said frame so that said brake levers simultaneously brake the respective said rear tires, said brake lever support brackets having a stop engaged by the associated said brake lever for determining said fully engaged position, and said brake lever support brackets are adapted to be adjustably mounted in different positions with releasable fasteners on said frame.

24. In a method of controlling the braking of an off-road vehicle comprising a frame, a pair of frame supporting rear wheels mounted on said frame, at least one frame supporting steerable front wheel mounted on said frame, at least one of said wheels having a flexible tire mounted thereon, a safety brake system comprising a brake lever mounted on said frame and adapted to be pivoted from a pivot position below the wheel axis into contact with said tire as said tire and associated wheel rotates in a forward direction and the need for braking the vehicle is sensed, and a brake control adapted to normally hold said brake lever in a release position clear of said tire and to alternatively initiate contact of said brake lever with said tire while said vehicle is traveling forwardly, the steps of:

(a) moving said vehicle in a forward direction;
(b) while said vehicle is traveling forwardly, operating said brake control to pivot said brake lever into initial contact with said tire; and
(c) maintaining the lever in contact with the tire to cause the momentum rotation of the tire created by the forward inertia of the vehicle to further pivot said lever to deflect the tire locally and lock the lever in braking position.

25. The method of claim 24 wherein said vehicle is backed to rotate said tire reversely and release said lever from locked position.

26. The method of claim 25 wherein said brake control is permitted to automatically restore said lever to release position once it is unlocked.

27. A safety brake system for an off-road passenger vehicle having a frame supported on at least one wheel with a flexible tire mounted thereon for rotation about an axis of rotation, said system comprising: a brake lever adapted to pivot into contact with the tire as the wheel rotates in one direction and then be forced by the rotating tire to pivot further into a fully engaged position where the brake lever causes local deflection of the tire to a degree sufficient to prevent further wheel rotation, and a brake control incorporated with said brake system is adapted to normally hold said brake lever in a release position clear of the tire and to alternatively initiate and maintain contact of the brake lever with the tire to effect braking of the wheel, said brake control including a pull cable connected to said brake lever and a spring adapted to normally hold said brake lever in said release position.

28. A safety brake system for an off-road passenger vehicle supported on at least a pair of wheels with flexible tires mounted thereon for rotation about an axis of rotation, said system comprising: brake levers adapted to pivot into contact with the tires as the wheels rotate in one direction and then be forced by the rotating tires to pivot further into a fully engaged position where the brake levers cause local deflection of the tires to a degree sufficient to prevent further wheel rotation; a pivot shaft rigidly connected to each of said brake levers; and a brake control incorporated with said brake system adapted to normally hold said brake levers in a release position clear of the tires and to alternatively initiate contact of said brake levers with the tires to effect braking of the wheels.

29. In combination with an off-road vehicle comprising a frame having front and rear ends supported on wheels; at least one of said wheels being mounted for forward and rearward rotation about an axis of rotation to move said frame forwardly and rearwardly respectively, said wheel having a flexible tire mounted thereon; a safety brake system including a brake lever mounted on the frame in fore to aft alignment with and adjacent said tire for swinging movement from a release non-contact position into initial contact with the tire, and, as said tire and associated wheel rotate in a forward direction, to swing further in the same direction into a fully engaged position where the brake lever causes local defection of the tire to a degree sufficient to lock said tire and associated wheel to prevent further rotation of the tire and associated wheel; said brake lever having a swing axis located below the said axis of rotation of the wheel and adjacent thereto; and a brake control associated with said brake lever to normally hold it clear of said tire in said release position actuatable to alternatively initiate contact of said brake lever with said tire, and to maintain said tire in engagement with the tire, to permit said tire to swing said brake lever further to locked braking position.

30. The combination as set forth in claim 29 wherein said one of said wheels is one of a pair of said wheels and said brake lever is associated with the tire provided thereon, an additional brake lever is associated with a tire provided on the other of said pair of wheels; and a pivot shaft is pivotally mounted on said frame and is rigidly connected to each of said brake levers to effect simultaneous braking of said pair of tires.

31. The combination as set forth in claim 29 wherein said brake control includes a pull cable connected to said brake lever and a spring is associated with said brake control for normally urging said brake lever to said release position.

* * * * *

UNITED STATES PATENT AND TRADEMARK OFFICE
CERTIFICATE OF CORRECTION

PATENT NO. : 5,452,775
DATED : September 26, 1995
INVENTOR(S) : Allen L. Bussinger It is certified that error appears in the above-identified patent and that said Letters Patent is hereby corrected as shown below:

Column 5, line 62, change "lever the brakes" to

-- lever 42A the brake --.

Signed and Sealed this

Nineteenth Day of December, 1995

Attest:

BRUCE LEHMAN

Attesting Officer

Commissioner of Patents and Trademarks